(12) United States Patent
Wilsey et al.

(10) Patent No.: US 7,720,940 B1
(45) Date of Patent: May 18, 2010

(54) MANAGING A NETWORK ELEMENT USING A TEMPLATE CONFIGURATION

(75) Inventors: Scott Daniel Wilsey, Mead, WA (US); Darren William Oye, Greenacres, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 116 days.

(21) Appl. No.: 11/864,692

(22) Filed: Sep. 28, 2007

(51) Int. Cl.
*G06F 15/177* (2006.01)
(52) U.S. Cl. ...................................... 709/220
(58) Field of Classification Search ................ 709/204, 709/220–226; 358/1.15; 705/6, 1, 28, 26, 705/27, 56, 35, 37, 44, 10; 717/121, 126, 717/177, 101; 707/100, 10
See application file for complete search history.

(56) References Cited

U.S. PATENT DOCUMENTS

| | | | |
|---|---|---|---|
| 5,870,610 A * | 2/1999 | Beyda | 717/173 |
| 6,085,238 A * | 7/2000 | Yuasa et al. | 709/223 |
| 6,272,537 B1 * | 8/2001 | Kekic et al. | 709/223 |
| 6,516,345 B1 | 2/2003 | Kracht | |
| 6,711,171 B1 * | 3/2004 | Dobbins et al. | 370/400 |
| 7,249,173 B2 | 7/2007 | Nicolson | |
| 7,440,408 B1 | 10/2008 | Anderson | |
| 2004/0054923 A1 | 3/2004 | Seago et al. | |
| 2005/0047350 A1 | 3/2005 | Kantor et al. | |
| 2006/0168208 A1 | 7/2006 | Nagami | |
| 2007/0214256 A1 | 9/2007 | Castaneda et al. | |

FOREIGN PATENT DOCUMENTS

WO WO 2008/046429 * 10/2006

OTHER PUBLICATIONS

U.S. Appl. No. 11/864,673, filed Sep. 28, 2007, Atkinson et al., "Multi-Stage Value Retrieval and Multi-Rate Value Retrieval".

* cited by examiner

*Primary Examiner*—Nathan Flynn
*Assistant Examiner*—Mark O Afolabi
(74) *Attorney, Agent, or Firm*—Wells St. John, P.S.

(57) ABSTRACT

An element manager acquires information identifying a network element. Based on the acquired information, the element manager associates a template configuration with the network element. The template configuration includes configuration parameter values. Subsequent to the associating, the element manager provides configuration information describing a configuration of the network element without retrieving the configuration information from the network element. The configuration information is based on the template configuration. An element manager and programming first determine that a configuration of a network element should match a template configuration. The configuration includes configuration parameter values utilized by the network element. The element manager and programming acquire at least one of the configuration parameter values and determine that the at least one acquired configuration parameter value does not match a corresponding configuration parameter value of the template configuration. Based on this determination, the element manager and programming take an action.

23 Claims, 13 Drawing Sheets

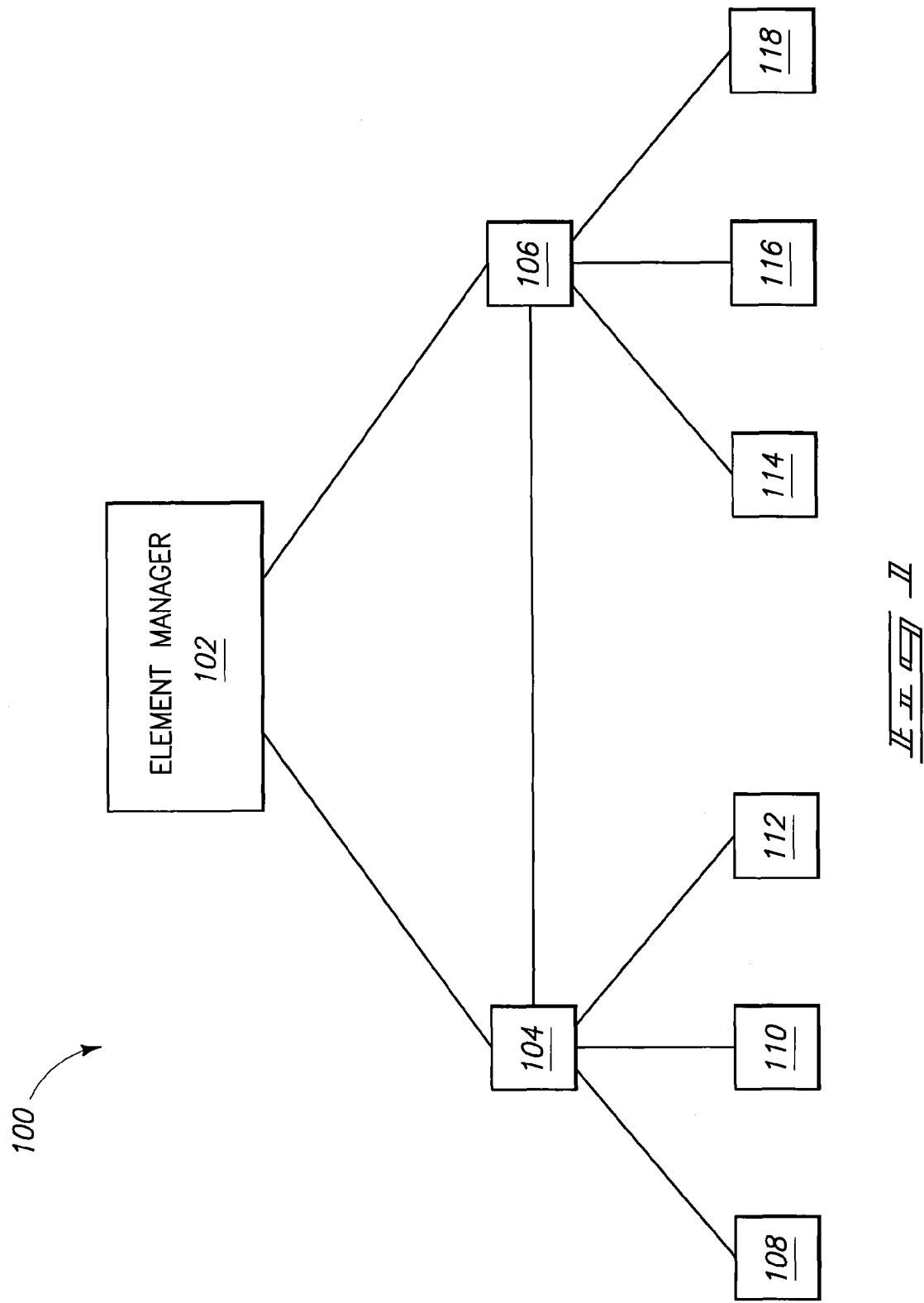

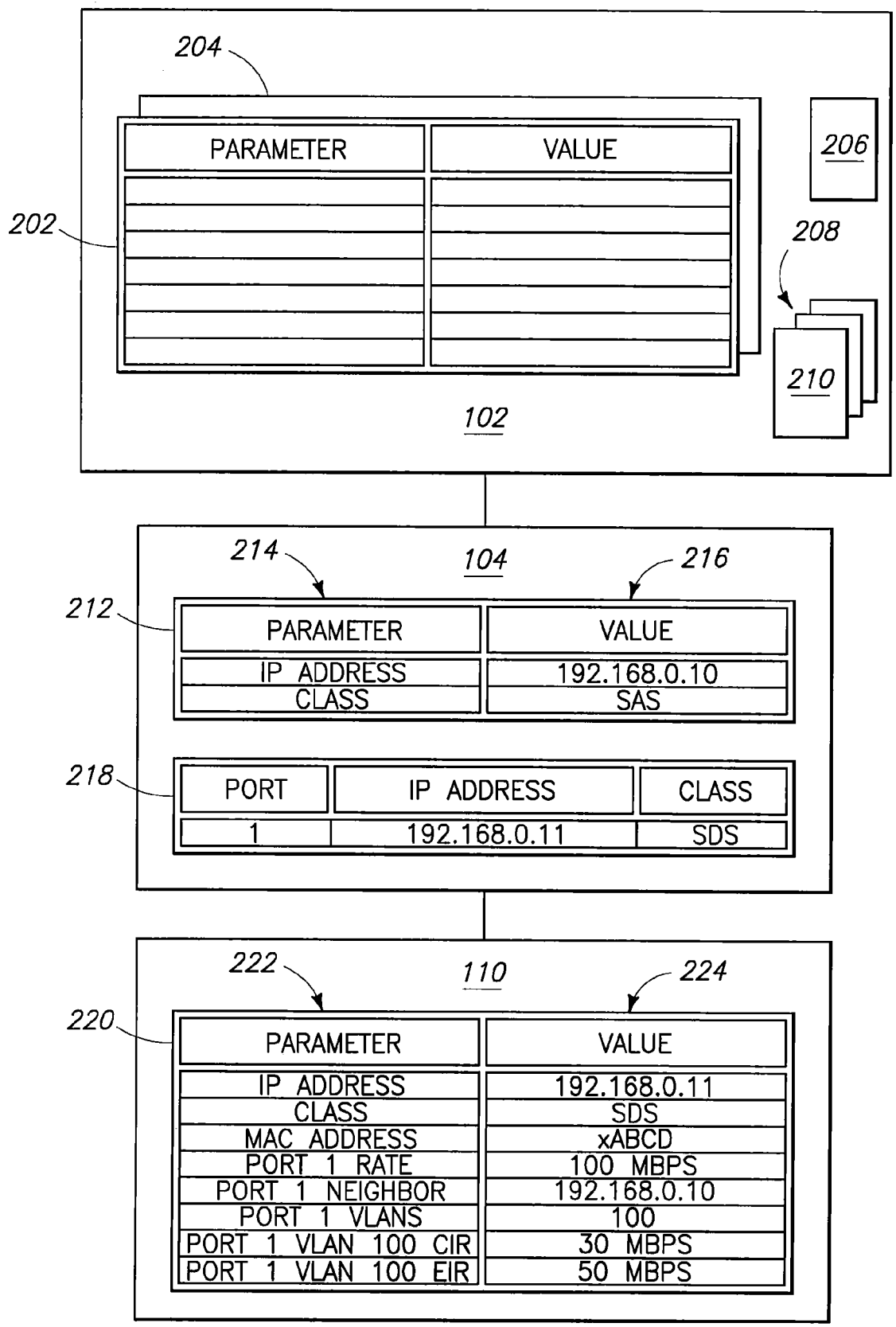

| CLASS | STAGES | STAGE ONE | STAGE TWO | STAGE THREE | STAGE FOUR |
|---|---|---|---|---|---|
| SDS | 3 | IP ADDRESS | | PORTS 1-8: VLANS | |
| | | CLASS | PORTS 1-8: RATE | PORTS 1-8: CIR FOR EACH VLAN | |
| | | MAC ADDRESS | PORTS 1-8: NEIGHBORS | PORTS 1-8: EIR FOR EACH VLAN | |
| SAS | 4 | IP ADDRESS | | BLADES 1-4: VLAN | BLADES 5-8: VLAN |
| | | CLASS | BLADES 1-8: PORT RATE | BLADES 1-4: CIR FOR EACH VLAN | BLADES 5-8: CIR FOR EACH VLAN |
| | | MAC ADDRESS | BLADES 1-8: PORT NEIGHBORS | BLADES 1-4: EIR FOR EACH VLAN | BLADES 5-8: EIR FOR EACH VLAN |

FIG. 3

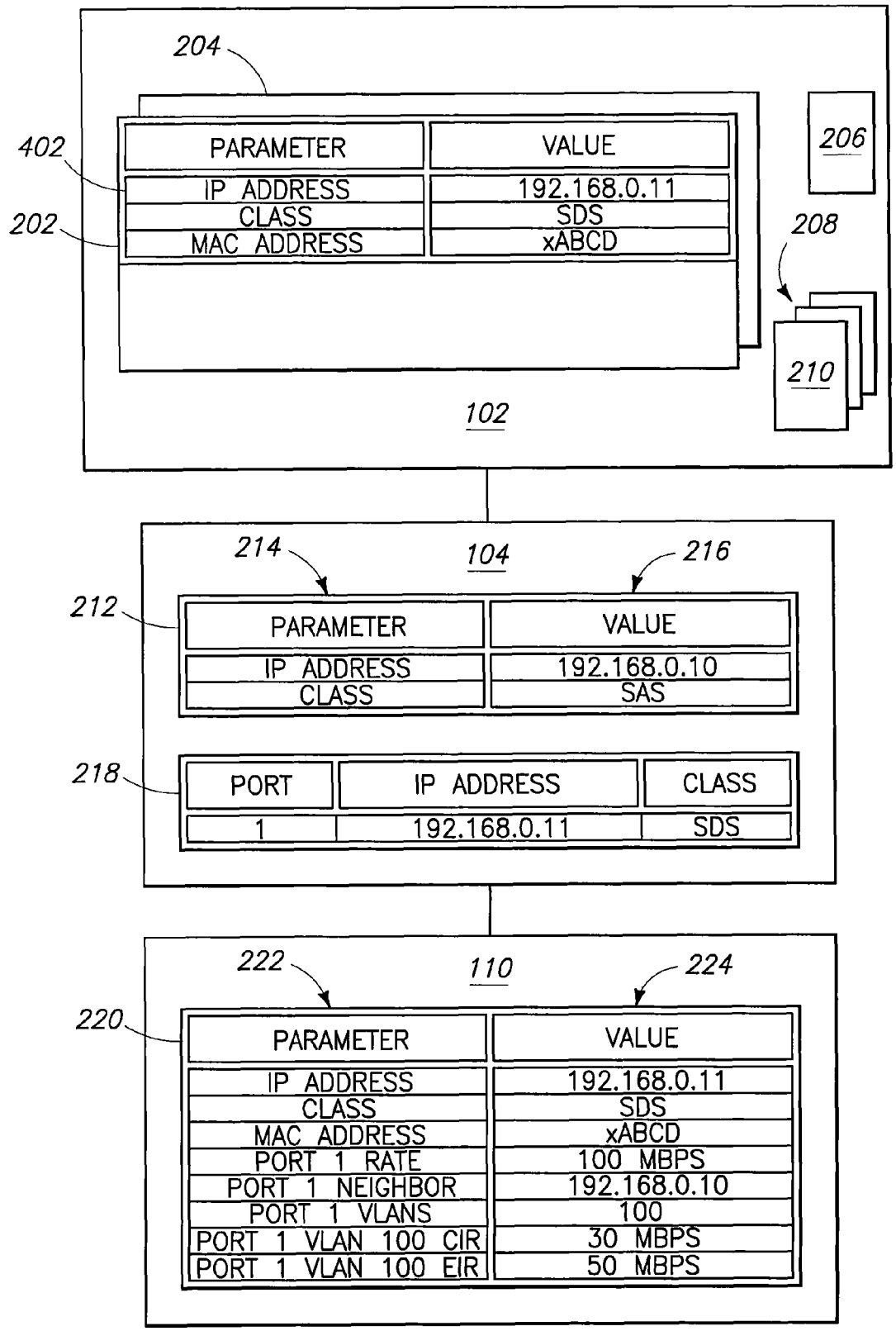

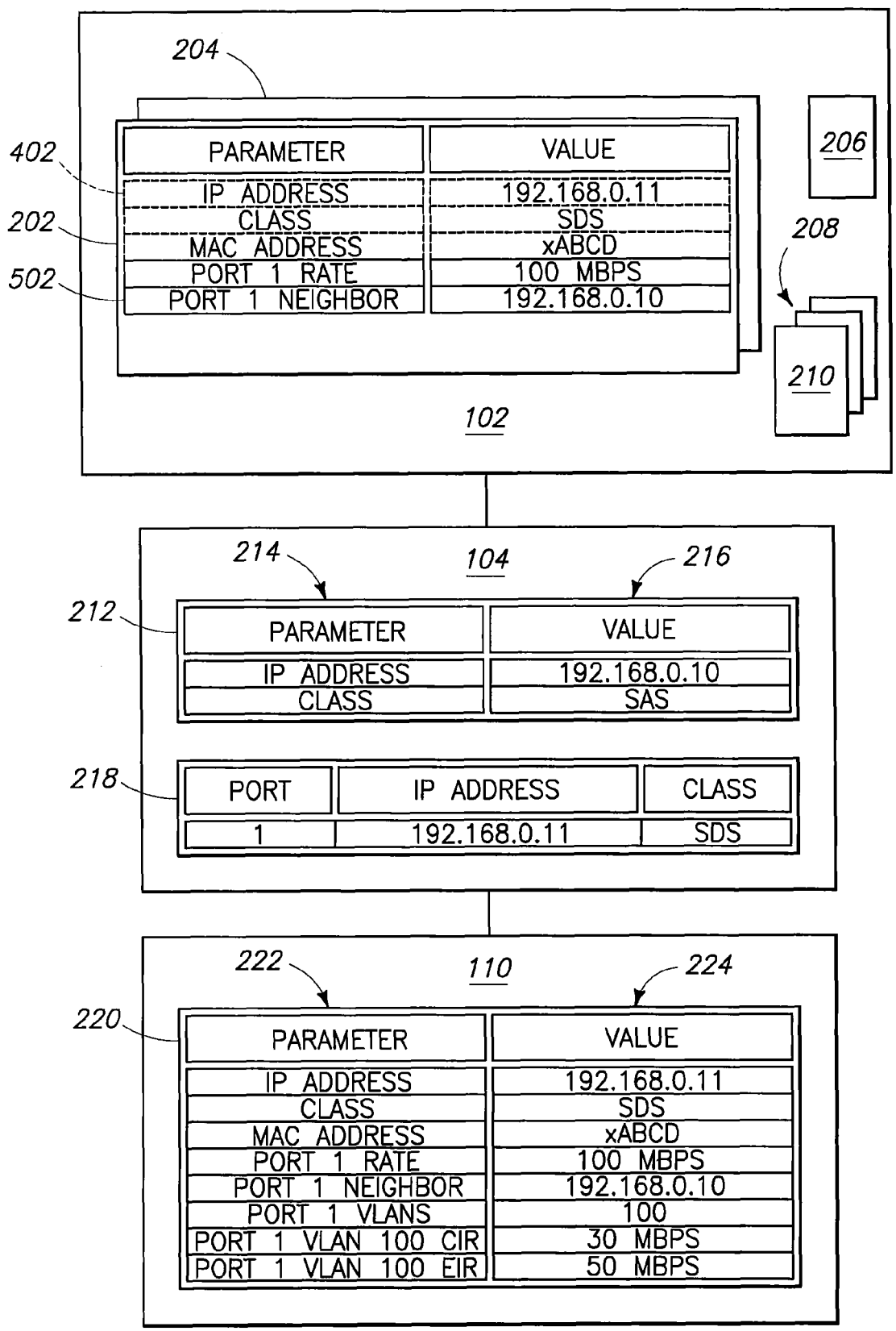

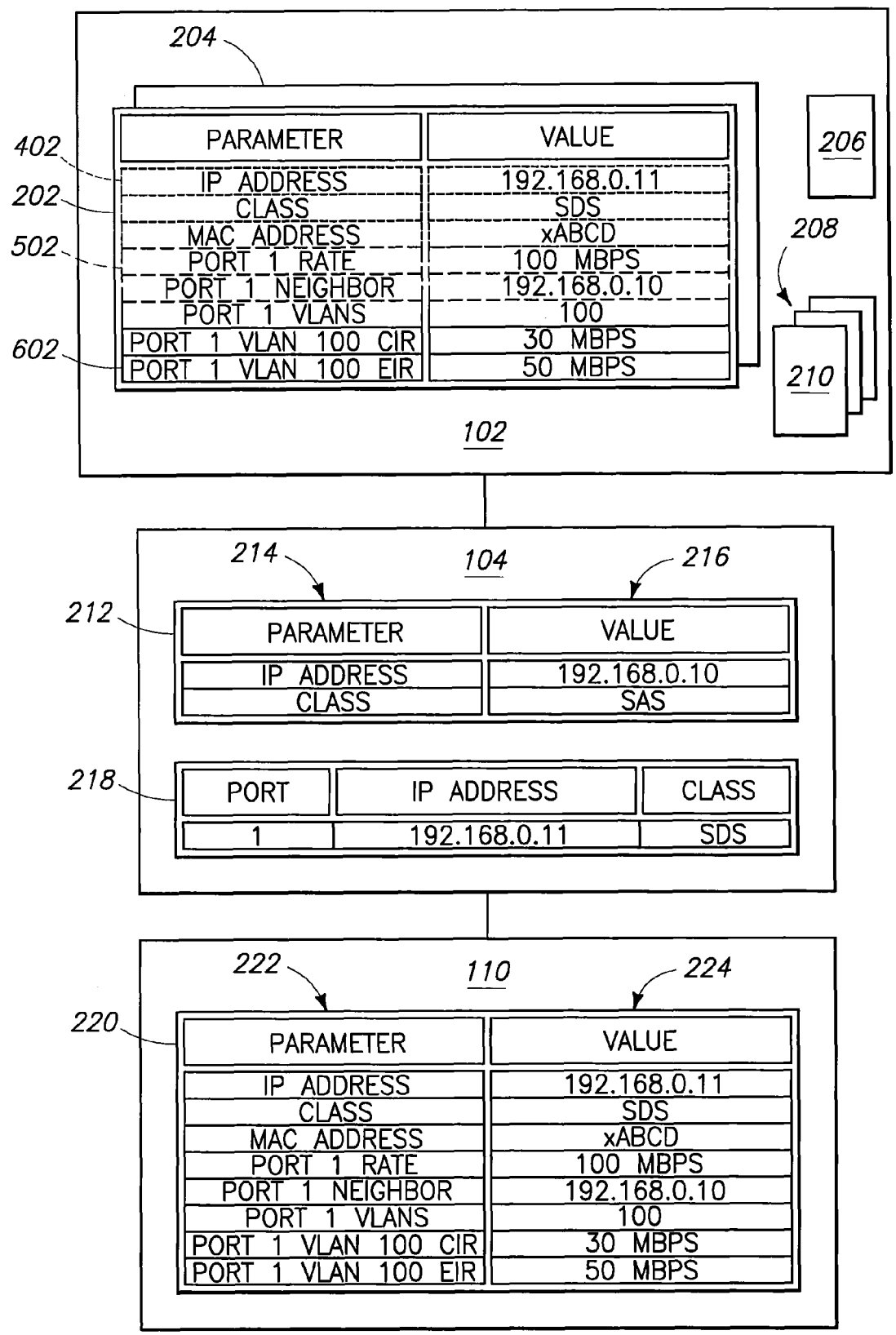

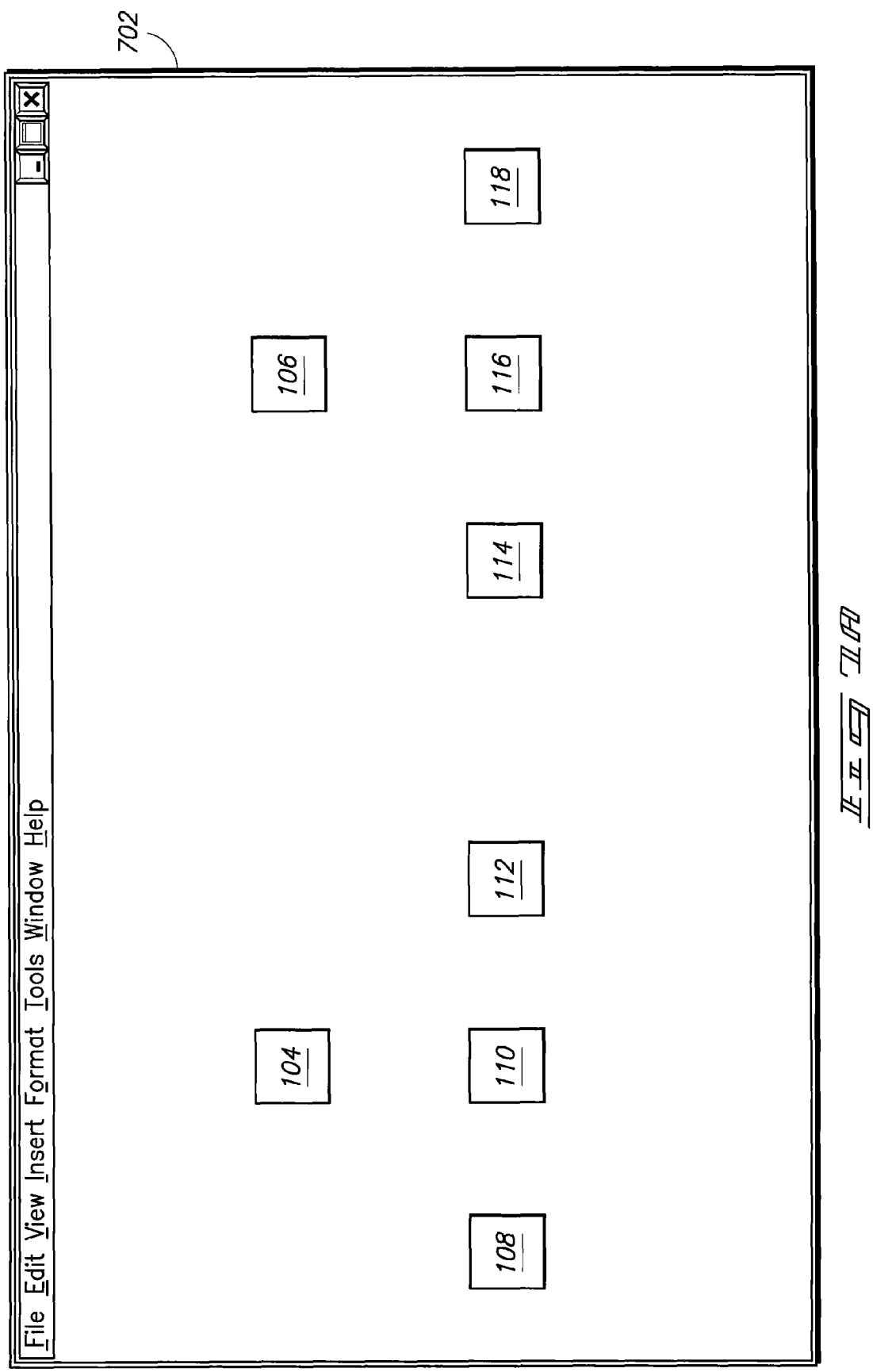

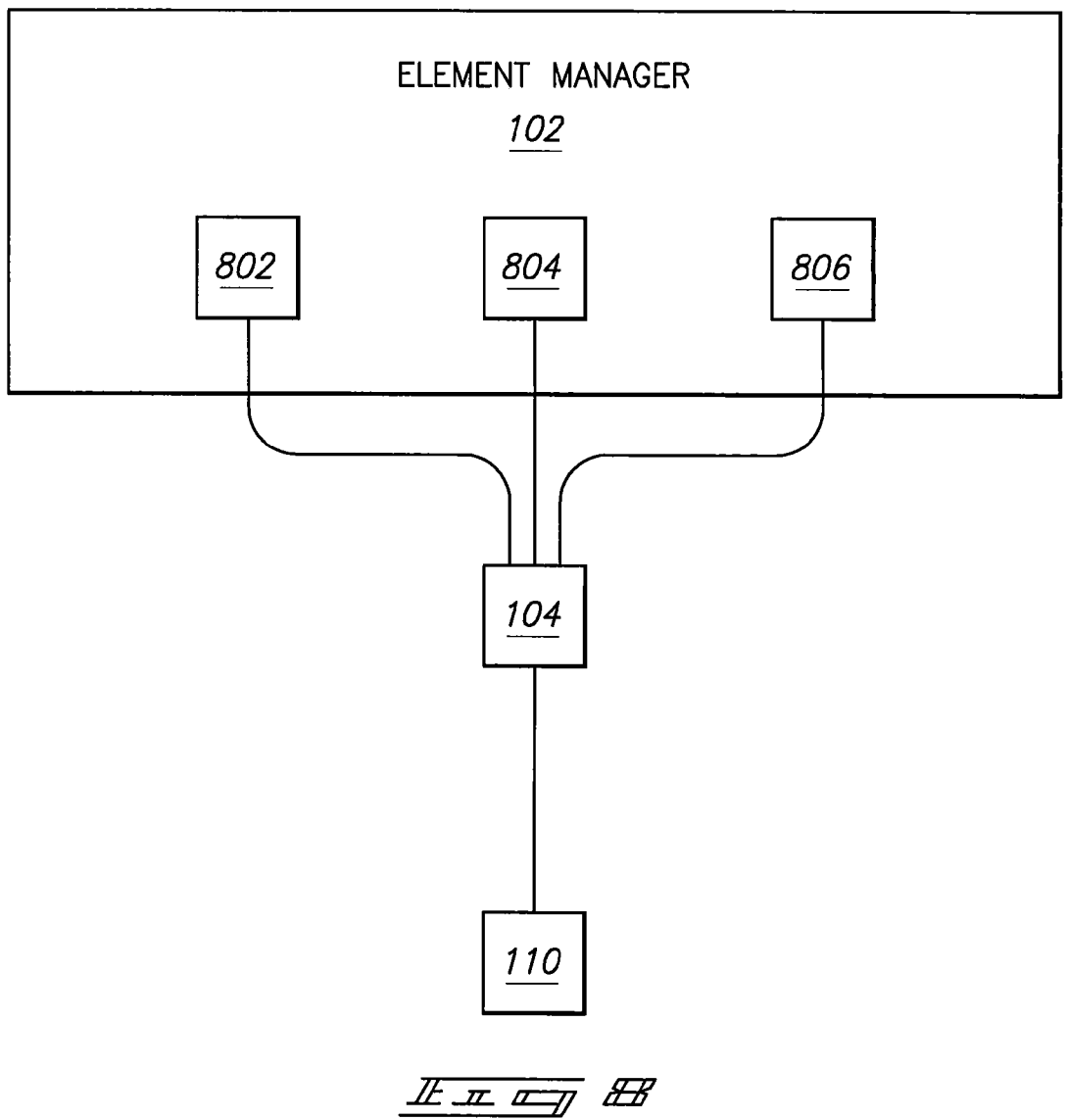

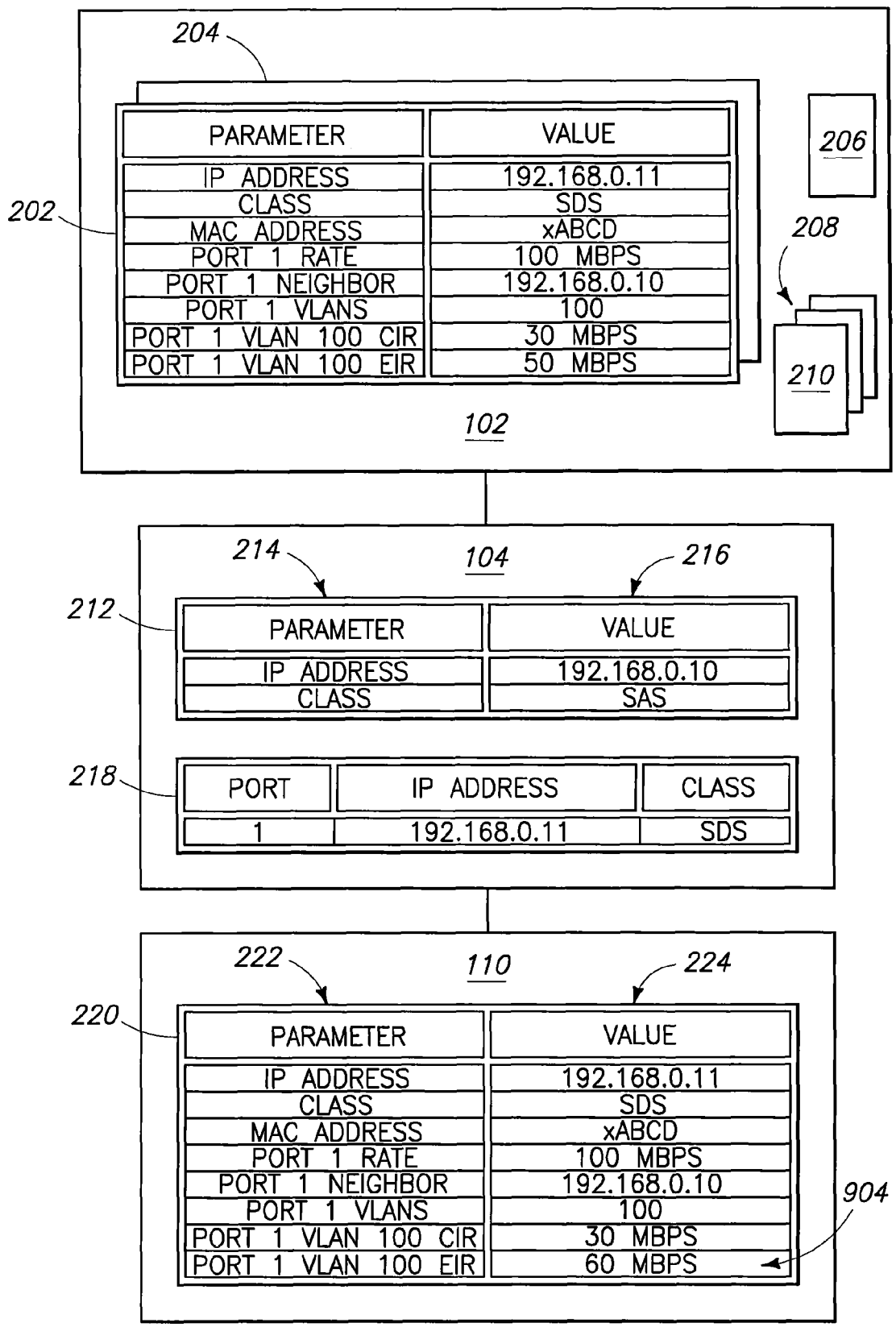

| PARAMETER | VALUE |
|---|---|
| PORT 1 RATE | 100 MBPS |
| PORT 1 VLANS | 100 |
| PORT 1 VLAN 100 CIR | 30 MBPS |
| PORT 1 VLAN 100 EIR | 40 MBPS |

FIG. 10

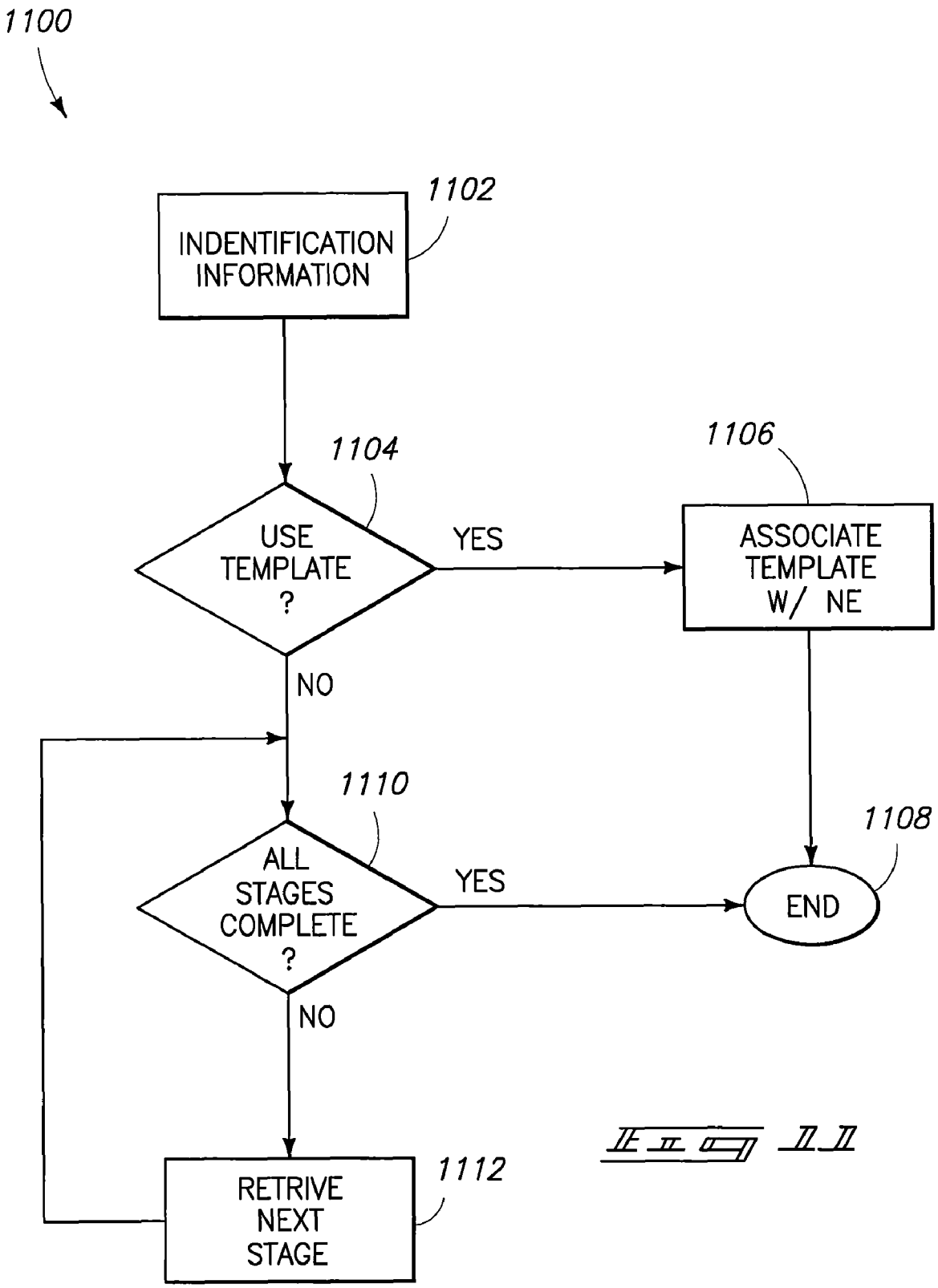

MANAGING A NETWORK ELEMENT USING A TEMPLATE CONFIGURATION

RELATED APPLICATION DATA

This application is related to simultaneously filed U.S. patent application Ser. No. 11/864,673 entitled "Multi-Stage Value Retrieval and Multi-Rate Value Retrieval" and naming K. Gintaras Atkinson, Scott Daniel Wilsey, Darren William Oye, Bo Wen, and Louis Reis as inventors.

TECHNICAL FIELD

The present invention, in various embodiments, relates to managing a network element using a template configuration.

BACKGROUND OF THE INVENTION

Networks of elements (e.g., packet switches, servers, routers, and the like) may be managed by an element manager. The element manager may perform various functions such as receiving alarms from the elements, upgrading software or firmware on the elements, and configuring the elements. In order to manage a network element, the element manager may use configuration information describing a configuration of the network element. In some cases, the element manager may retrieve the configuration information from the network element.

Retrieving configuration information from one network element might not seem burdensome. However, retrieving configuration information from a large number of network elements may be time consuming and may significantly burden a network connecting the network elements together by consuming a large amount of bandwidth during inconvenient periods of time.

BRIEF DESCRIPTION OF THE DRAWINGS

Preferred embodiments of the invention are described below with reference to the following accompanying drawings.

FIG. 1 illustrates a network of elements.

FIG. 2 illustrates a set of charts depicting network element configuration information.

FIG. 3 illustrates a chart depicting assignment of configuration information to stages.

FIG. 4 illustrates another set of charts depicting network element configuration information.

FIG. 5 illustrates yet another set of charts depicting network element configuration information.

FIG. 6 illustrates another set of charts depicting network element configuration information.

FIG. 7A illustrates a first network topology as displayed by an element manager.

FIG. 8 illustrates another network of elements.

FIG. 9 illustrates yet another set of charts depicting network element configuration information.

FIG. 10 illustrates a chart depicting values associated with a template configuration.

FIG. 11 is a flow chart diagram of a method in accordance with an aspect of the invention.

DETAILED DESCRIPTION OF THE PREFERRED EMBODIMENTS

Figure 7B:
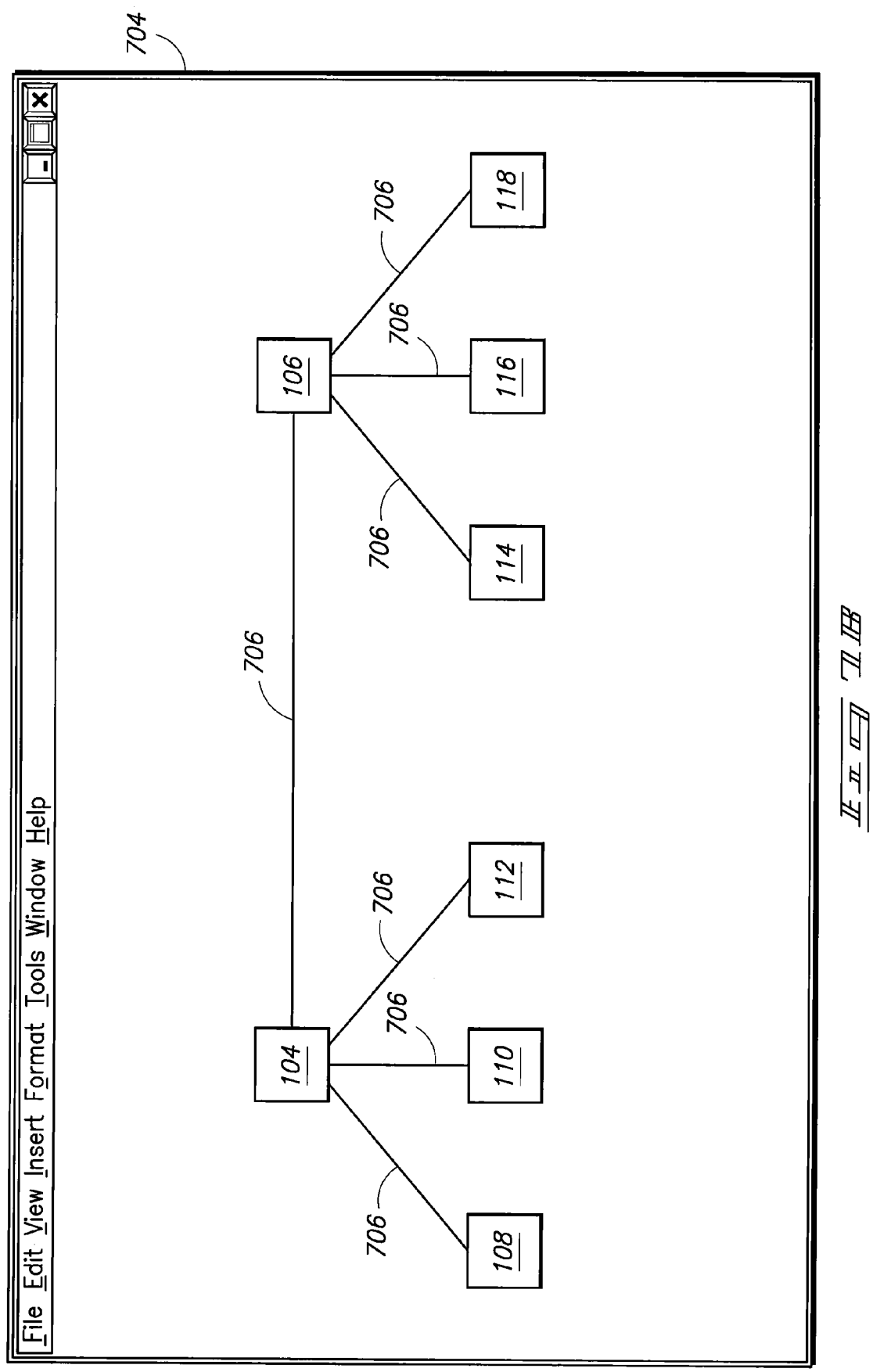
FIG. 7B illustrates a second network topology as displayed by an element manager.

According to one aspect of the invention, an element manager operating method includes discovering that a network managed by the element manager includes a network element. Discovering the network element may include automatically discovering the network element without user intervention. The network element may be discovered based on information received from other network elements of the network or based on information received from the network element. Prior to discovering the network element, the element manager may be unaware of the network element.

The network element stores a set of values describing a configuration of the network element. The method also includes automatically retrieving three or more subsets of the set of values from the network element in three or more respective, different stages in response to discovering that the network managed by the element manager includes the network element. The network element may store additional values that are not part of the set of values. In some cases, no value of the set may belong to more than one of the subsets.

The method may additionally include other actions. For example, the method may include determining a class of the network element, selecting a set of parameters from a plurality of different sets of parameters based on the class, and selecting the number of stages in which the set of values is automatically retrieved based on the class. The set of parameters may correspond with the set of values to be retrieved.

The method may also include scheduling the retrieving associated with one of the stages independent of schedules of the other stages of retrieving. The method may include presenting one or more of the values retrieved during a first one of the stages to a user of the element manager prior to the retrieving associated with another one of the stages.

The method may also include detecting that the configuration of the network element has changed and automatically retrieving values associated with the changed configuration subsequent to discovering the network element and retrieving the values of the original configuration.

The network element may be an Ethernet switch. The three or more subsets of the set of values may be automatically retrieved without user intervention via Internet Protocol (IP) packets. By way of example, the three or more subsets of the set of values may be retrieved using Simple Network Management Protocol (SNMP) messages, eXtensible Markup Language (XML) messages, responses to command line interface (CLI) commands, replies to remote method invocations (RMIs), or NETCONF messages.

Some parameters used by the method may be user configurable. For example, the number of stages may be user configurable and a mapping of the set of values into the subsets may be user configurable.

Programming configured to cause processing circuitry to perform the method may be included on an article of manufacture, such as a compact disc (CD), digital versatile disc (DVD), a hard disk drive, a memory chip, or other memory device.

FIG. 1 illustrates a network 100 of elements 104, 106, 108, 110, 112, 114, 116, and 118. The elements may be packet switches, computers, servers, routers, or other devices capable of being connected to a network. The elements of network 100 are interconnected by links. Each link directly connects two of the elements of network 100 together.

An element manager 102 is physically connected to elements 104 and 106. Although physically connected to elements 104 and 106, element manager 102 has logical connectivity to the other elements of network 100. Element manager 102 may communicate with the elements of network 100 using one or more of a variety of techniques. For example, the communication may take place via IP packets, SNMP messages, XML messages, CLI commands, RMI, or NETCONF messages.

In some configurations, element manager 102 may be implemented as software operating on one or more servers. The number of elements that element manager 102 is capable of managing may depend on the specifications of the server(s) on which the software is installed. For example, a low-end server may be able to manage a small number of elements, whereas a cluster of high-end servers may be able to manage a large number of devices.

Element manager 102 may perform various management functions with respect to the elements of network 100. For example, element manager 102 may discover the presence of the elements of network 100 and the connections between the elements. Element manager 102 may provide information about network 100, such as topological information, to a network operator.

Initially, element manager 102 might not be aware of any of the elements of network 100. To discover the elements of network 100, element manager 102 may be provided with an address of one of the elements of network 100. For example, element manager 102 may discover element 104 if element 104 sends an SNMP trap to element manager 102. Based on the SNMP trap, element manager 102 may determine an IIP address of element 104 and may subsequently communicate with element 104 and retrieve neighbor identification information describing elements of network 100 directly connected to element 104, namely elements 106, 108, 110, and 112.

Element manager 102 may use the retrieved neighbor identification information to discover additional elements of network 100. For example, element manager 102 may use the retrieved neighbor information identifying element 106 to retrieve neighbor information describing elements of network 100 directly connected to element 106, namely elements 104, 114, 116, and 118. In this manner, element manager 102 may discover the elements of network 100.

Element manager 102 may alternatively use other techniques to discover the elements of network 100. For example, element manager 102 may ping a range of addresses to discover the elements if the elements have addresses within the range. In some configurations, element manager 102 may discover the elements of network 100 automatically without user intervention.

Once element manager 102 is aware of the elements of network 100, element manager 102 may retrieve configuration information from the elements. The elements of network 100 may each be programmed according to a configuration. The configuration of a network element may determine how the network element behaves. For example, if network element 104 is an Ethernet switch, a configuration of element 104 may specify which ports of element 104 are enabled and which are disabled.

Element manager 102 may use the configuration information in managing the network elements. For example, element manager 102 may present the configuration information to a user. Using element manager 102 to view configuration information for the elements of network 100 may be more convenient than if the user individually retrieved configuration information from the elements of network 100. Element manager 102 may store configuration information that it retrieves from the elements of network 100.

FIG. 2 illustrates a set of charts 202, 212, 218, and 220 used to indicate configuration information stored by element manager 102, element 104, and element 110. Chart 220 depicts configuration information stored by element 110 including parameters 222 and corresponding values 224. For example, chart 220 indicates that element 110 has an IP address of 192.168.0.11 and a class of "SDS." Other parameters of the configuration of element 110 include: Medium Access Control (MAC) address, port 1 rate, port 1 neighbor, port 1 Virtual Local Area Networks (VLANs), port 1 VLAN 100 Committed Information Rate (CIR), and port 1 VLAN 100 Excess Information Rate (EIR).

Element 110 may use values 224 corresponding with parameters 222 during operation of element 110. For example, element 110 may use the fact that the parameter port 1 VLAN 100 CIR has a value of 30 Mbps to guarantee that on port 1, VLAN 100 is provided with a minimum of 30 Mbps of bandwidth. Of course, a configuration of element 110 may include other parameters and values not depicted in chart 220.

Chart 218 depicts configuration information for neighboring elements directly connected (either physically or logically) to element 104. Element 104 may gather configuration information from the neighboring elements. In particular, the configuration information of chart 218 is configuration information for element 110. Element 104 may acquire the configuration information of chart 218 via communication with element 110. For example, element 104 may acquire the configuration information of chart 218 via Link Layer Discovery Protocol (LLDP) messages received from element 110 or other layer-two control packets received from element 110. In some configurations of element 104, element 104 may retrieve a relatively small portion of the configuration of element 110. In other words, element 104 may retrieve some of values 224 from element 110 but might not retrieve all of values 224.

Chart 212 depicts configuration information describing a configuration of element 104 including parameters 214 and values 216. Of course, the configuration of element 110 may include additional parameters and values not illustrated by chart 212.

Element manager 102 may retrieve some or all of the configuration information for element 110 from element 110 and store the configuration information. Chart 202 depicts configuration information for element 110 known by element manager 102. FIG. 2 illustrates contents of chart 202 at a moment in time when element manager 102 has not yet retrieved configuration information for element 110. Accordingly, chart 202 is empty. Element manager 102 may retrieve configuration information for other elements of network 100. For example, chart 204 may depict configuration information retrieved for element 104.

Upon discovering element 110, element manager 102 may automatically retrieve configuration information from element 110 in a plurality of stages. For example, in one stage element manager 102 may retrieve the IP address, class, and MAC address from element 110. In a later stage, element manager 102 may retrieve the port 1 rate and the port 1 neighbor from element 110. In yet another stage, element manager 102 may retrieve port 1 VLANs, Port 1 VLAN 100 CIR, and Port 1 VLAN 100 EIR from element 110.

Element manager 102 may include a stage mapping 206 that specifies the number of stages in which configuration information is retrieved and the particular parameter values to be retrieved in each stage. Stage mapping 206 is described in detail below in relation to FIG. 3. Element manager 102 may also include one or more template configurations 208, which are described in detail below.

FIG. 3 illustrates a chart depicting stage mapping 206. Element manager 102 may use stage mapping 206 to determine the number of stages in which configuration information is to be retrieved from the elements of network 100 as well as the particular parameter values to be retrieved in each of the stages. In one configuration, stage mapping 206 is organized by device class. Each element of network 100 may be associated with a device class. The device class may generally indicate the capability or physical properties of a particular element.

For example, if the elements of network 100 are Ethernet switches, each switch may be assigned a device class based on the number of ports of the switch or based on the switch model. By way of example, stage mapping 206 depicts two devices classes in column 302: Service Distribution Switch (SDS) and Service Aggregation Switch (SAS). An SDS may be a switch intended to be deployed at a subscriber location. Accordingly, an SDS may have a relatively small number of ports and consequently a relatively small number of configuration parameters.

An SAS, on the other hand, may be a switch intended to be connected to a number of SDSs and to aggregate traffic received from the SDSs to which it is connected. Accordingly, an SAS may have a larger number of ports than an SDS and may have redundancy features that an SDS does not have, such as redundant power supplies or redundant fans. In fact, an SAS may be a multi-blade switch. Consequently, an SAS may have more configuration parameters than an SDS.

Column 304 of stage mapping 206 indicates that configuration parameter values of elements belonging to device class SDS are to be retrieved in three stages and that configuration parameter values of elements belonging to device class SAS are to be retrieved in four stages, perhaps because of the larger number of parameters associated with devices of class SAS.

Column 306 indicates the parameter values to be retrieved in a first stage. Likewise, columns 308, 310, and 312 indicate the parameter values to be retrieved in second, third, and fourth stages respectively. Columns 306, 308, 310, and 312 of stage mapping 206 also convey a set of parameter values to be retrieved for each class. For example, the set of parameter values to be retrieved for class SDS includes IP Address, class, MAC address, rate of ports 1-8, neighbors of ports 1-8, VLANs assigned on ports 1-8, CIR values for each VLAN on each of ports 1-8, and EIR values for each VLAN on each of ports 1-8.

The set of parameter values to be retrieved for class SAS has a larger number of parameters than the set of values of class SDS and includes IP Address, class, MAC address, port rate for the ports of blades 1-8, port neighbors for the ports of blades 1-8, VLANs assigned on the ports of blades 1-8, CIR values for each VLAN on each of the ports of blades 1-8, and EIR values for each VLAN on each of the ports of blades 1-8.

By way of example, element manager 102 may use stage mapping 206 to retrieve configuration information from element 110 as follows. First, element manager 102 may retrieve a value for the device class parameter from element 110 and determine that element 110 is of device class SDS. Based on the device class, element manager 102 may consult stage mapping 206 to determine the set of configuration parameter values to be retrieved from element 110 and the number of stages in which to retrieve the set.

Element manager 102 may then begin retrieving the configuration parameter values from element 110 one stage at a time. Retrieval of each stage may be independently scheduled. For example, stage 2 may be retrieved at a moment in time that is independent from when stage one is retrieved. Some stages may be retrieved immediately after element manager 102 initially discovers a device while other stages may be delayed until a maintenance window planned during times of low network usage, for example, late at night.

The arrangement of stage mapping 206 may be user configurable. In other words, the set of configuration parameter values to be retrieved for a class, the number of stages for the class, and the division of the set of configuration parameter values among the stages for the class may all be user configurable. As used herein, a user-configurable parameter or setting is a parameter or setting having a value that may be altered by a network operator, for example, by using an element manager to alter the value. In some cases, a particular configuration parameter is assigned to only one of the stages so that the particular configuration parameter is not retrieved in more than one of the stages. Accordingly, a user may customize the configuration parameter values that are retrieved for a particular device class to his needs and thereby control the time and duration of configuration parameter value retrieval.

For example, a user may want to immediately retrieve two stages of configuration parameter values upon discovering an element in order to accurately display the newly discovered element in a physical topology of a network but may want to delay retrieving other stages that include a large number of configuration parameter values until a maintenance window so as not to consume a large amount of network bandwidth.

Figure 7C:
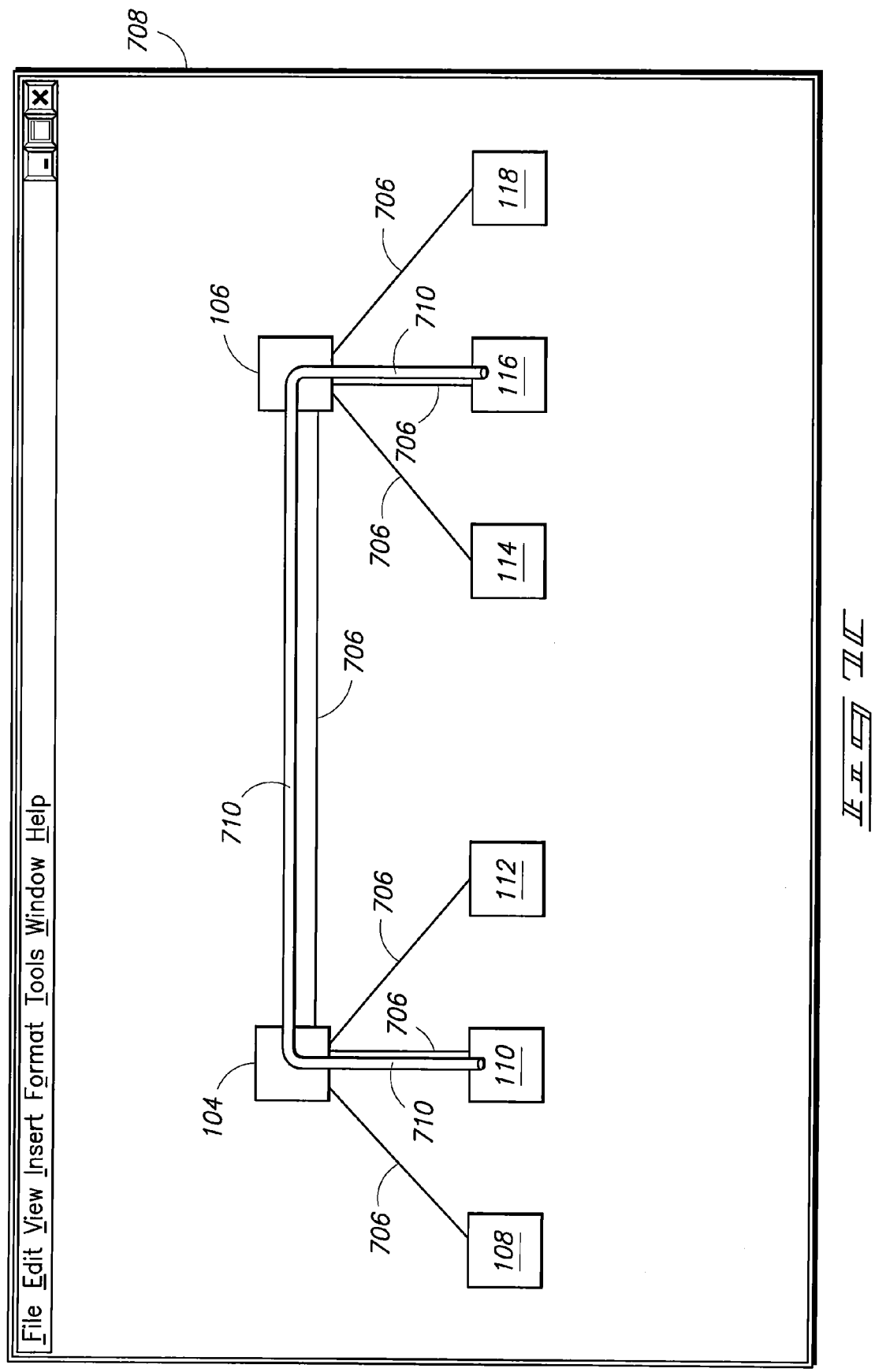
FIG. 7C illustrates a third network topology as displayed by an element manager.

FIGS. 4-6 illustrate steps of a stage-based retrieval of a configuration of element 110 by element manager 102 and FIGS. 7A-C illustrate the use of the stages of retrieved configuration values in creating a topological view of network 100.

FIG. 4 illustrates the contents of chart 202 at a second moment in time subsequent to the first moment in time illustrated in FIG. 2. Prior to this second moment in time, element manager 102 has consulted stage mapping 206 to determine the configuration parameters associated with stage one and has retrieved values from element 110 corresponding with the configuration parameters associated with stage one. Element manager 102 may then store the retrieved values. Accordingly, chart 202 depicts that element manager has retrieved stage-one values 402, including the IP address, class, and MAC address, from element 110.

Element manager 102 may similarly retrieve stage-one values from other elements of network 100. After retrieving the stage-one values, element manager 102 may use the retrieved stage-one values to create a topology diagram of network 100 and display the topology diagram to a user.

FIG. 7A illustrates a topology diagram 702 of network 100 at the second moment in time. According to stage mapping 206, stage-one parameters for both class SDS and SAS relate to device identification information such as IP address and MAC address. Consequently, at the second moment in time, element manager 102 is aware of the elements of network 100 but is not aware of how the elements of network 100 are interconnected. Accordingly, topology diagram 702 depicts the elements of network 100 as unconnected elements.

However, topology diagram 702 may still be useful to a network operator since the network operator may be able to learn which devices are in network 100 from topology diagram 702. Since topology diagram 702 does not rely on configuration parameter values from stage two, stage three, or stage four, element manager 102 may display topology diagram 702 prior to, or while stage-two, stage-three, or stage-four values are being retrieved from the elements of network 100. Displaying topology diagram 702 prior to completing other stages of retrieval may be useful since the network operator will be able to view topology diagram 702 shortly after stage-one retrieval is complete instead of having to wait for all four stages of retrieval to be completed. This time advantage may be significant for networks having a large number of elements.

FIG. 5 illustrates the contents of chart 202 at a third moment in time subsequent to the second moment in time illustrated in FIG. 4. Prior to this third moment in time, element manager 102 has consulted stage mapping 206 to determine the configuration parameters associated with stage two and has retrieved values from element 110 corresponding with the configuration parameters associated with stage two. Element manager 102 may then store the retrieved values. Accordingly, chart 202 depicts that element manager has retrieved stage-two values 502, including the port 1 rate and the port 1 neighbor, from element 110.

By way of example, element 110 is illustrated as having a rate and neighbor for port 1 but not for other ports of element 110. This may be because port 1 is the only port of element 110 to which another element (element 104 in this example) is connected. In other examples, the configuration of element 110 may include rates and neighbors for other ports of element 110.

Element manager 102 may similarly retrieve stage-two values from other elements of network 100. After retrieving the stage-two values, element manager 102 may use the retrieved stage-two values to update the topology diagram of network 100 and display the updated topology diagram to a user.

FIG. 7B illustrates a topology diagram 704 of network 100 at the third moment in time. According to stage mapping 206, stage-two parameters for both class SDS and SAS include neighbor information. Consequently, at the third moment in time element manager 102 is aware of the elements of network 100 and how the elements of network 100 are interconnected. Accordingly, topology diagram 704 depicts the elements of network 100 and links 706 connecting the elements together.

Topology diagram 704 may be useful to a network operator since the network operator may be able to learn how the elements of network 100 are interconnected. Since topology diagram 704 does not rely on configuration parameter values from stage three or stage four, element manager 102 may display topology diagram 704 prior to, or while stage-three or stage-four values are being retrieved from the elements of network 100. Displaying topology diagram 704 prior to completing other stages of retrieval may be useful since the network operator will be able to view topology diagram 704 shortly after stage-two retrieval is complete instead of having to wait for all four stages of retrieval to be completed.

FIG. 6 illustrates the contents of chart 202 at a fourth moment in time subsequent to the third moment in time illustrated in FIG. 5. Prior to this fourth moment in time, element manager 102 has consulted stage mapping 206 to determine the configuration parameters associated with stage three and has retrieved values from element 110 corresponding with the configuration parameters associated with stage three. Element manager 102 may then store the retrieved values. Accordingly, chart 202 depicts that element manager has retrieved stage-three values 602, including the port 1 VLANs, port 1 VLAN 100 CIR and the port 1 VLAN 100 EIR, from element 110.

Element manager 102 may similarly retrieve stage-three values from other elements of network 100. After retrieving the stage-three values, element manager 102 may use the retrieved stage-three values to update the topology diagram of network 100 and display the updated topology diagram to a user.

FIG. 7C illustrates a topology diagram 708 of network 100 at the fourth moment in time. According to stage mapping 206, stage-three parameters for both class SDS and SAS include VLAN information. Consequently, at the fourth moment in time element manager 102 is aware of the elements of network 100, how the elements of network 100 are physically interconnected, and how the elements are logically interconnected via VLANs. Accordingly, topology diagram 708 depicts the elements of network 100, physical links 706 connecting the elements together, and a logical link 710. Logical link 710 represents the fact that in this example, VLAN 100 is present in elements 110, 104, 106, and 116. Topology diagram 708 may be useful to a network operator since the network operator may be able to learn how the elements of network 100 are logically interconnected.

According to another aspect of the invention, a network includes a first network element configured to provide first values describing a configuration of the first network element and a second network element configured to provide second values describing a configuration of the second network element. The first network element may belong to a different element class than the second network element. Furthermore, the first network element may be a single-blade Ethernet switch (e.g., an Ethernet switch having a fixed number of ports) and the second network element may be a multi-blade Ethernet switch (e.g., an Ethernet switch having a chassis to which one or more port modules may be connected).

The network also includes an element manager configured to discover the network elements, to automatically retrieve the first values in a first number of stages, and to automatically retrieve the second values in a different second number of stages. The element manager may include a first server and a second server. In this case, retrieving the first values may include retrieving a first subset of the first values using the first server during one of the stages and a second subset of the first values using the second server during a different one of the stages.

The element manager may be configured to schedule the retrieving of the first values associated with one of the stages independent of schedules of the other stages of the retrieving of the first values. Furthermore, the element manager may be configured to discover the network elements based either on information received from other network elements of the network or information received from the network elements.

By way of example, element manager 102 may retrieve a class parameter value from element 110 and based on the class parameter value (and stage mapping 206) determine that three stages are to be used in retrieving configuration parameter values from element 110 since element 110 is of class SDS. In contrast, element manager 102 may retrieve a class parameter value from element 104 and based on the class parameter value (and stage mapping 206) determine that four stages are to be used in retrieving configuration parameter values from element 104 since element 104 is of class SAS.

In some configurations, an element manager may comprise more than one server. In these configurations, multiple servers of the element manager may be utilized in retrieving configuration parameter values from network elements. For example, each of the multiple servers may be used to retrieve configuration parameter values of a different one of the stages.

FIG. 8 illustrates network elements 104 and 110 and element manager 102 of FIG. 1. In this example configuration, element manager 102 includes three servers 802, 804, and 806. Servers 802, 804, and 806 are capable of retrieving configuration parameter values from elements 104 and 110.

In one example configuration, server 802 may be configured to retrieve stage-one values from elements 104 and 110, server 804 may be configured to retrieve stage-two values from elements 104 and 110, and server 806 may be configured to retrieve stage-three values from element 110 and stage-three and stage-four values from element 104.

In another example configuration, server 802 may be configured to retrieve configuration parameter values of all stages from elements of class SDS, server 804 may be configured to retrieve configuration parameter values of all stages from elements of class SAS, and server 806 may be configured to retrieve configuration parameter values of all stages from elements of another class not illustrated in stage mapping 206. Of course, other divisions of configuration parameter retrieval between servers 802, 804, and 806 are also possible.

According to another aspect of the invention, an element manager operating method includes discovering a plurality of packet switches, each packet switch of the plurality being configured to store a set of values describing a configuration of the packet switch. The set of values corresponds with a set of parameters. The method also includes repeatedly retrieving values corresponding with a first subset of the set of parameters from each of the plurality of packet switches at a first regular interval and repeatedly retrieving values corresponding with a second subset of the set of parameters from each of the plurality of packet switches at a second regular interval different from the first regular interval.

The method may also include comparing a most recently retrieved version of the values corresponding with the first subset with a different previously retrieved version of the values corresponding with the first subset and alerting a user if the most recently retrieved version does not match the previously retrieved version.

The number of parameters belonging to the first subset may be smaller than the number of parameters belonging to the second subset. Some parameters used by the method may be user configurable. For example, the lengths of the regular intervals may be user configurable, the number of parameters belonging to the first subset may be user configurable, and the number of parameters belonging to the second subset may be user configurable.

Programming configured to cause processing circuitry to perform the method may be included on an article of manufacture, such as a compact disc (CD), digital versatile disc (DVD), a hard disk drive, a memory chip, or other memory device.

By way of example, element manager 102 may retrieve stage-two values from the elements of network 100 once a day to detect new elements that may be added to network 100 since stage-two values include neighbor information according to column 308 of stage mapping 206. Stage-two values may be a relatively small amount of data to retrieve from the elements of network 100 and therefore retrieval of stage-two values may consume a short enough period of time that the retrieval may fit within a daily maintenance window.

Furthermore, element manager 102 may retrieve stage-three and stage-four values once a week. Stage-three and stage-four values may be retrieved at this lower frequency because they may represent a larger amount of data than stage-two values and thus may take a longer period of time to retrieve. Accordingly, stage-three and stage-four retrieval may be scheduled during a weekend maintenance window. Of course, the frequency with which values of the various stages are retrieved may be user configurable Regularly retrieving configuration parameter values from the elements of network 100 may be useful since the configuration parameter values may change over time. For example, a network operator may access a network element and change a configuration parameter value without notifying element manager 102 of the change. Until element manager 102 detects the change, element manager 102 may be operating with inaccurate configuration information for the element. Consequently, information provided by element manager 102, such as the topology diagrams of FIGS. 7A-C may be inaccurate.

Element manager 102 may update its version of configuration information for elements of network 100 by regularly retrieving configuration parameter values from the elements, detecting differences between the element manager version of the configuration information and the retrieved configuration information, and taking action on the differences. In one configuration, element manager 102 may replace its version of configuration information when element manager 102 retrieves new configuration information from the elements of network 100. In another configuration, element manager 102 may alert a user of detected differences.

FIG. 9 illustrates the contents of charts 202 and 220 at a fifth moment in time subsequent to the fourth moment in time illustrated in FIG. 6. Prior to this fifth moment in time, the EIR for port 1 VLAN 100 has been modified from 50 Mbps to 60 Mbps as illustrated at 904. This modification may be due to a network operator modifying the configuration of element 110. Element manager 102 may retrieve the EIR value for port 1 VLAN 100 subsequent to the modification. Upon retrieving the EIR value, element manager 102 may compare the retrieved EIR value (60 Mbps) with the previously retrieved EIR value (50 Mbps) and determine that the EIR value has changed. In response to this determination, element manager 102 may alert a user to the mismatch. Element manager 102 may alternatively or additionally update chart 202 to have the new EIR value (60 Mbps) retrieved from element 110.

In some configurations, element manager 102 may detect that a configuration of an element of network 100 has been modified. For example, the element may notify element manager 102 when a configuration parameter value of the element has been modified. In response to the detection, element manager 102 may retrieve configuration parameter values from the element.

According to another aspect of the invention, an element manager operating method includes acquiring information identifying a network element and, based on the acquired information, associating a template configuration with the network element. Acquiring the identifying information may include retrieving the identifying information either from the network element or from another network element directly connected to the network element. The template configuration includes configuration parameter values.

The method also includes, subsequent to the associating, providing configuration information describing a configuration of the network element without retrieving the configuration information from the network element. Providing the configuration information may include providing the configuration information to a user of the element manager. The configuration information is based on one or more of the configuration parameter values of the template configuration.

The network element may be a packet switch and the acquired information may include at least one identifier selected from among a device class, an Internet Protocol (IP) address, a Medium Access Control (MAC) address, a serial number, and a Simple Network Management Protocol (SNMP) system object identifier.

The method may include other actions. For example, the method may include associating the template configuration with other network elements. The method may include, in response to the acquiring, selecting the template configuration from a plurality of template configurations based on the acquired information. The method may include, prior to the associating, determining that the network element is not included in an exception set, the exception set identifying network elements with which a template configuration should not be associated.

The method may include acquiring information identifying an additional network element, the additional network element having a different device class than the network element and based on the different device class, associating a different template configuration with the additional network element.

In some example networks, a set of network elements may be deployed that have a common configuration. The common configuration may be described in a template configuration accessible to element manager 102. In these networks, it may be more efficient for element manager 102 to identify which elements of network 100 have the common configuration and to associate the template configuration with these elements rather than retrieving the common configuration from each of the elements since retrieving the common configuration may consume a significant amount of time and network bandwidth.

To determine whether element 110 has the common configuration, element manager 102 may retrieve information identifying element 110 such as an IP address, class, serial number, SNMP system object identifier, and/or MAC address from element 110. In one configuration, element manager 102 may retrieve the identifying information from element 110 as was described above. Alternatively, element manager 102 may retrieve the identifying information from an element directly connected to element 110, such as element 104, since, as was described above, element 104 may have information identifying element 110 as a result of element 104 receiving neighbor information from element 110.

Upon receiving the identifying information, element manager 102 may compare the identifying information with one or more criteria to determine whether element 110 should have the common configuration. If the one or more criteria are satisfied, element manager 102 may associate the template configuration with element 110 rather than retrieving configuration information from element 110. Many different criteria may be used. For example, the criteria may specify that elements having a particular device class and/or a particular system object identifier are to be associated with a particular template.

Alternatively or additionally, the criteria may specify that devices having a serial number, IP address, or MAC address within a particular range are to be associated with a particular template. Other criteria are also possible. For example, a criterion may specify that an element having a class SDS that is connected to a port (either a logical port or a physical port) of another element having a class SAS is to be associated with a particular template.

The identifying information may also be compared with an exception set. The exception set may specify elements that should not be associated with a template configuration even if identifying information of the elements satisfies criteria associated with the template configuration. For example, the criteria may specify that elements having an IP address within a particular range of IP addresses should be associated with a template configuration. However, an exception set may specify a list of elements having IP addresses that are within the particular range that should not be associated with the template configuration despite having an IP address within the particular range.

Furthermore, the identifying information may be compared with several criteria. For example, the identifying information may be compared with first criteria associated with a first template configuration. If the first criteria are not satisfied, the identifying information may be compared with second criteria associated with a second template configuration. In this manner, the identifying information may be compared with a plurality of criteria to see which, if any, of the criteria are satisfied. If one of the criteria is satisfied, element manager 102 may associate a template configuration associated with the satisfied criteria with element 110.

Element manager 102 may have access to several different template configurations 208 as illustrated in FIG. 2. In some configurations, element manager 102 may store template configurations 208.

A particular template configuration, such as template configuration 210 of FIG. 2, may be associated with more than one element of network 100. For example, if elements 114, 116, and 118 each have identifying information satisfying criteria associated with template configuration 210, element manager 102 may associate template configuration 210 with elements 114, 116, and 118.

If a template configuration is associated with a particular element, such as element 110, element manager 102 may use the template configuration rather than retrieving configuration parameter values from element 110. Alternatively, element manager 102 may retrieve a portion of the configuration parameter values from element 110 and may refer to the template configuration for other configuration parameter values.

FIG. 10 is a chart depicting template configuration 210. Template configuration 210 includes parameters 1002 and corresponding values 1004. In particular, template configuration 210 specifies values for the following parameters: port 1 rate, port 1 VLANs, CIR for VLAN 100 on port 1, and EIR for VLAN 100 on port 1. Of course, template configuration 210 could include additional parameters and corresponding values. A small number of parameters and values are illustrated in FIG. 10 for simplicity.

Note that template configuration 210 does not include IP address or MAC address. In the case of the IP address and the MAC address, these values may be unique for each element. Accordingly, values for these parameters might not be included in template configuration 210. Consequently, element manager 102 may retrieve the IP address and MAC address from elements of network 100 since these values might not be accessible to element manager 102 via template configuration 210.

In contrast, configuration parameter values that are not unique per element, such as port rates or VLANs, may be included in template configuration 210. Thus, as was mentioned above, element manager 102 may retrieve a portion of the configuration parameter values from an element and may refer to template configuration 210 for other configuration parameter values.

According to another aspect of the invention, an element manager operating method includes determining whether an implemented configuration of the network element should be equivalent to a template configuration. The implemented configuration includes a set of implemented values and the template configuration includes a set of template values. The set of implemented values may be larger than the set of template values. The template values may be stored by the element manager and the implemented values may be stored by the network element.

If the implemented configuration should be equivalent to the template configuration, the method uses the template values as a set of represented values. If the implemented configuration need not be equivalent to the template configuration, the method includes using the implemented values as the represented values. The method further includes creating or modifying a representation of a configuration of the network element. The representation includes the represented values.

The method may also include presenting the represented values to a user of the element manager in response to receiving a query from the user regarding the network element.

Determining whether the implemented configuration should be equivalent to the template configuration may include a number of actions. For example, the determining may include determining that an identifier of the network element is a member of a set of selected identifiers, determining that the network element is connected to a selected port of another network element, determining that a device class of the network element matches a selected device class, and/or retrieving at least one of the implemented values from the network element.

Programming configured to cause processing circuitry to perform the method may be included on an article of manufacture, such as a compact disc (CD), digital versatile disc (DVD), a hard disk drive, a memory chip, or other memory device.

By way of example, chart 220 of FIG. 6 may depict an implemented configuration of element 110 since chart 220 depicts configuration parameter values that element 110 uses in operation. Further, chart 202 may depict a represented configuration of element 110 since chart 202 depicts configuration parameter values of element 110 according to element manager 102. One way element manager 102 may determine the represented configuration of element 110 is to retrieve the configuration parameter values from element 110.

Alternatively, as was discussed above, element manager 102 may compare identification information of element 110 with one or more criteria to determine whether element manager 102 should associate a template configuration with element 110. If the criteria are satisfied, element manager 102 may associate the template configuration associated with the criteria with element 110.

For example, element manager 102 may retrieve identification information, such as device class or IP address, from element 110. Based on the identification information, element manager 102 may determine that template configuration 210 should be associated with element 110. Accordingly, element manager 102 may use parameter values from template configuration 210 in populating a represented configuration of element 110. Consequently, element manager 102 may have a represented configuration of element 110 including a rate for port 1, VLANs for port 1, a CIR for VLAN 100 on port 1, and an El R for VLAN 100 on port 1 without having to retrieve these values from element 110.

The represented configuration may include other configuration parameter values that are retrieved from element 110 such as an IP address, class, and MAC address. Thus, the represented configuration may include values from template configuration 210 and values from the implemented configuration of element 110.

Element manager 102 may use the represented configuration of element 110 in performing management functions. For example, element manager 102 may use the represented configuration in generating the topology diagram of FIG. 7C.

The represented configuration may match the implemented configuration. However, as was described above in relation to FIG. 9, it is possible for the represented configuration (the version of the configuration stored by element manager 102) to disagree with the implemented configuration, for example, if a network operator accesses element 110 and changes a configuration parameter value of element 110.

According to another aspect of the invention, an element manager operating method includes first determining that a configuration of a network element should match a template configuration, the configuration comprising configuration parameter values utilized by the network element, acquiring at least one of the configuration parameter values, second determining that the at least one acquired configuration parameter value does not match a corresponding configuration parameter value of the template configuration, and taking an action based on the second determination.

Acquiring the at least one configuration parameter value may include acquiring the at least one configuration parameter value from the network element. Alternatively, acquiring the at least one configuration parameter value may include acquiring the at least one configuration parameter value from another network element, the another network element having acquired the at least one configuration parameter value via using at least one of Link Layer Discovery Protocol (LLDP) packets conforming to the Institute of Electrical and Electronics Engineers (IEEE) 802.1AB standard; Operations, Administration, and Maintenance (OAM) packets conforming to the IEEE 802.3ah standard; or Link Aggregation Control Protocol (LACP) packets conforming to the IEEE 802.3ad standard.

The method may also include, in response to determining that the at least one acquired configuration parameter value does not match a corresponding configuration parameter value of the template configuration, alerting a user of the element manager to the mismatch and/or configuring the network element so that the configuration of the network element matches the template configuration.

Programming configured to cause processing circuitry to perform the method may be included on an article of manufacture, such as a compact disc (CD), digital versatile disc (DVD), a hard disk drive, a memory chip, or other memory device.

By way of example illustrating the method described above, element manager 102 may create a represented configuration of element 110. However, in some cases the represented configuration may not be accurate. For example, the represented configuration may be based on template configuration 210 which specifies that the EIR for VLAN 100 on port 1 should be 40 Mbps. Thus, element manager 102 may specify in the represented configuration that the EIR for VLAN 100 on port 1 is 40 Mbps. However, the represented configuration is only accurate if in fact the EIR for VLAN 100 on port 1 is set to 40 Mbps. In relying on template configuration 210, element manger 102 might not retrieve the EIR value for VLAN 100 on port 1 from element 110.

In some cases, the implemented configuration of element 110 (the configuration parameter values actually being used by element 110) may not match template configuration 110. Thus, the represented configuration is inaccurate.

In some configurations, element manager 102 may perform an audit function by retrieving an implemented configuration parameter value of element 110 and comparing the implemented configuration parameter value with the corresponding represented configuration parameter value. If the two values do not match, element manager 102 may take action. For example, element manager 102 may alert a network operator of the mismatch. Alternatively or additionally, element manager 102 may change the value of the parameter on element 110 so that the value matches template configuration 210. Alternatively or additionally, element manager 102 may change the value of the represented configuration of element 110 so that the represented value matches the implemented value.

By way of example, element manager 102 may retrieve the implemented configuration parameter value from element 110. Alternatively, element manager 102 may retrieve the implemented configuration parameter value from a neighboring element directly connected to element 110 such as element 104. The neighboring element may have acquired the implemented configuration parameter value via layer-two protocol packets received from element 110.

FIG. 11 illustrates a method 1100 whereby a template configuration and stage-based retrieval of configuration parameter values may be combined to produce a representation of a configuration of a network element. At 1102, an element manager retrieves information identifying a network element. As was discussed above, the identifying information may be retrieved from the network element or may be retrieved from a directly connected neighbor of the network element. The element manager may use the identifying information to create or modify the representation of the configuration of the network element.

At 1104, the element manager determines whether the identification information satisfies a criteria associated with a template configuration. For example, as was described above, the criteria may specify that a device class of the network element (which may be included in the identification information) match a particular device class. If the criteria are satisfied, at 1106 the element manager associates the template configuration with the network element and uses values of the template configuration to create or modify the representation of the configuration of the network element after which the method ends at 1108.

If the criteria are not satisfied, at 1110, the element manager determines whether all stages of configuration parameter value retrieval have been completed. If all stages have been completed, the method ends at 1108. If some stages have not been completed, the element manager retrieves, at 1112, the configuration parameter values associated with the incomplete stage from the network element. The element manager continues to retrieve stages of configuration parameter values until all stages have been retrieved.

According to another aspect of the invention, an article of manufacture includes media including programming configured to cause processing circuitry (e.g., a microprocessor) to perform processing that executes one or more of the methods described above. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

Some specific examples of articles of manufacture including media with programming include, be electronic, magnetic, optical, electromagnetic, infrared, or but are not limited to, a portable magnetic computer diskette (such as a floppy diskette or a zip semiconductor media. disk manufactured by the Iomega Corporation of San Diego, Calif.), hard drive, random access memory, read only memory, flash memory, cache memory, and/or other configurations capable of storing programming, data, or other digital information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An element manager operating method comprising:
   an element manager acquiring information identifying a first network element, the first network element comprising a first set of configuration parameter values that influence behavior of the network element;
   based on the acquired information, the element manager associating a template configuration with the first network element, the template configuration comprising a second set of configuration parameter values determined without accessing the first set of configuration parameter values and stored by a network node other than the first network element, the second set of configuration parameter values representing the first set of configuration parameter values; and
   subsequent to the associating, the element manager providing configuration information describing a configuration of the first network element and comprising one or more of the configuration parameter values of the second set without retrieving the configuration parameter values of the first set represented by the one or more configuration parameter values of the second set from the first network element; and
   the element manager associating the template configuration with a second network element comprising a third set of configuration parameter values that influence behavior of the second network element, the second set of configuration parameter values representing the third set of configuration parameter values.

2. The method of claim 1 wherein the providing the configuration information comprises the element manager providing the configuration information to a user of the element manager.

3. The method of claim 1 wherein the acquiring the identifying information comprises the element manager retrieving the identifying information from another network element directly connected to the first network element without the element manager communicating with the first network element.

4. The method of claim 1 further comprising in response to the acquiring, the element manager selecting the template configuration from a plurality of template configurations based on the acquired information.

5. The method of claim 1 wherein the first network element is a packet switch and the acquired information comprises at least one identifier selected from among a device class, an Internet Protocol (IP) address, a Medium Access Control (MAC) address, a serial number, and a Simple Network Management Protocol (SNMP) system object identifier.

6. The method of claim 1 further comprising prior to the associating of the template configuration with the first network element, the element manager determining that the first network element is not included in an exception set, the exception set identifying network elements with which a template configuration should not be associated.

7. The method of claim 1 wherein the template configuration is a first template configuration and further comprising:
the element manager acquiring information identifying an additional network element, the additional network element having a different device class than the first network element; and
based on the different device class, the element manager associating a second template configuration different from the first template configuration with the additional network element.

8. An element manager operating method comprising:
an element manager determining whether an implemented configuration of a first network element should be equivalent to a template configuration associated with the first network element, the implemented configuration comprising a first set of configuration parameter values stored by the first network element, the first set of configuration parameter values influencing behavior of the first network element and the template configuration comprising a second set of configuration parameter values stored by a network node other than the first network element, the second set of configuration parameter values representing the first set of configuration parameter values;
if the implemented configuration should be equivalent to the template configuration, the element manager using the second set of configuration parameter values as a set of represented values; if the implemented configuration need not be equivalent to the template configuration, the element manager using the first set of configuration parameter values as the represented values;
the element manager providing information describing the first network element, the information comprising the represented values; and
the element manager associating the template configuration with a second network element comprising a third set of configuration parameter values that influence behavior of the second network element, the second set of configuration parameter values representing the third set of configuration parameter values.

9. The method of claim 8 further comprising in response to receiving a query from a user of the element manager regarding the first network element, the element manager presenting the represented values to the user.

10. The method of claim 8 wherein the second set of configuration parameter values are stored by the element manager.

11. The method of claim 8 wherein the first set of configuration parameter values is larger than the second set of configuration parameter values.

12. The method of claim 8 wherein the determining comprises determining that an identifier of the first network element is a member of a set of selected identifiers.

13. The method of claim 8 wherein the determining comprises determining that the first network element is connected to a selected port of another network element.

14. The method of claim 8 wherein the determining comprises determining that a device class of the first network element matches a selected device class.

15. The method of claim 8 wherein the determining comprises retrieving at least one of the first set of configuration parameter values from the first network element.

16. An article of manufacture comprising media comprising programming configured to cause processing circuitry to perform the method of claim 8.

17. An element manager operating method comprising:
an element manager first determining that a first set of configuration parameter values of a first network element should match a second set of configuration parameter values of a template configuration associated with the first network element, the first set of configuration parameter values residing on the first network element and influencing behavior of the first network element and the second set of configuration parameter values being stored by a network node other than the first network element and the second set of configuration parameter values representing the first set of configuration parameter values;
the element manager acquiring at least one of the configuration parameter values of the first set of configuration parameter values;
the element manager second determining that the acquired at least one of the first set of configuration parameter values does not match the at least one of the second set of configuration parameter values representing the at feast one of the first set of configuration parameter values;
the element manager taking an action based on the second determination; and
the element manager associating the template configuration with a second network element comprising a third set of configuration parameter values that influence behavior of the second network element, the second set of configuration parameter values representing the third set of configuration parameter values.

18. The method of claim 17 wherein the first network element comprises an Ethernet switch and the acquiring the at least one of the first set of configuration parameter values comprises retrieving the at least one of the first set of configuration parameter values using one or more SNMP messages, eXtensible Markup Language (XML) messages, responses to command line interface (CLI) commands, replies to remote method invocations (RMIs), or NETCONF messages.

19. The method of claim 17 wherein the acquiring comprises acquiring the at least one of the configuration parameter values of the first set of configuration parameter values from the first network element.

20. The method of claim 17 wherein the acquiring comprises acquiring the at least one of the configuration parameter values of the first set of configuration parameter values from a third network element, the third network element having acquired the at least one of the configuration parameter values of the first set of configuration parameter values via at least one of Link Layer Discovery Protocol (LLDP) packets conforming to the Institute of Electrical and Electronics Engineers (IEEE) 802.1AB standard; Operations, Administration, and Maintenance (OAM) packets conforming to the IEEE 802.3ah standard; or Link Aggregation Control Protocol (LACP) packets conforming to the IEEE 802.3ad standard.

21. The method of claim 17 further comprising in response to the second determining, the element manager alerting a user of the element manager to the mismatch.

22. The method of claim 17 further comprising in response to the second determining, the element manager configuring the first network element so that the configuration of the first network element matches the template configuration.

23. An article of manufacture comprising media comprising programming configured to cause processing circuitry to perform the method of claim 17.

* * * * *